Oct. 11, 1960 G. DOMINICK ET AL 2,955,875
FABRIC ATTACHMENT
Original Filed June 8, 1955
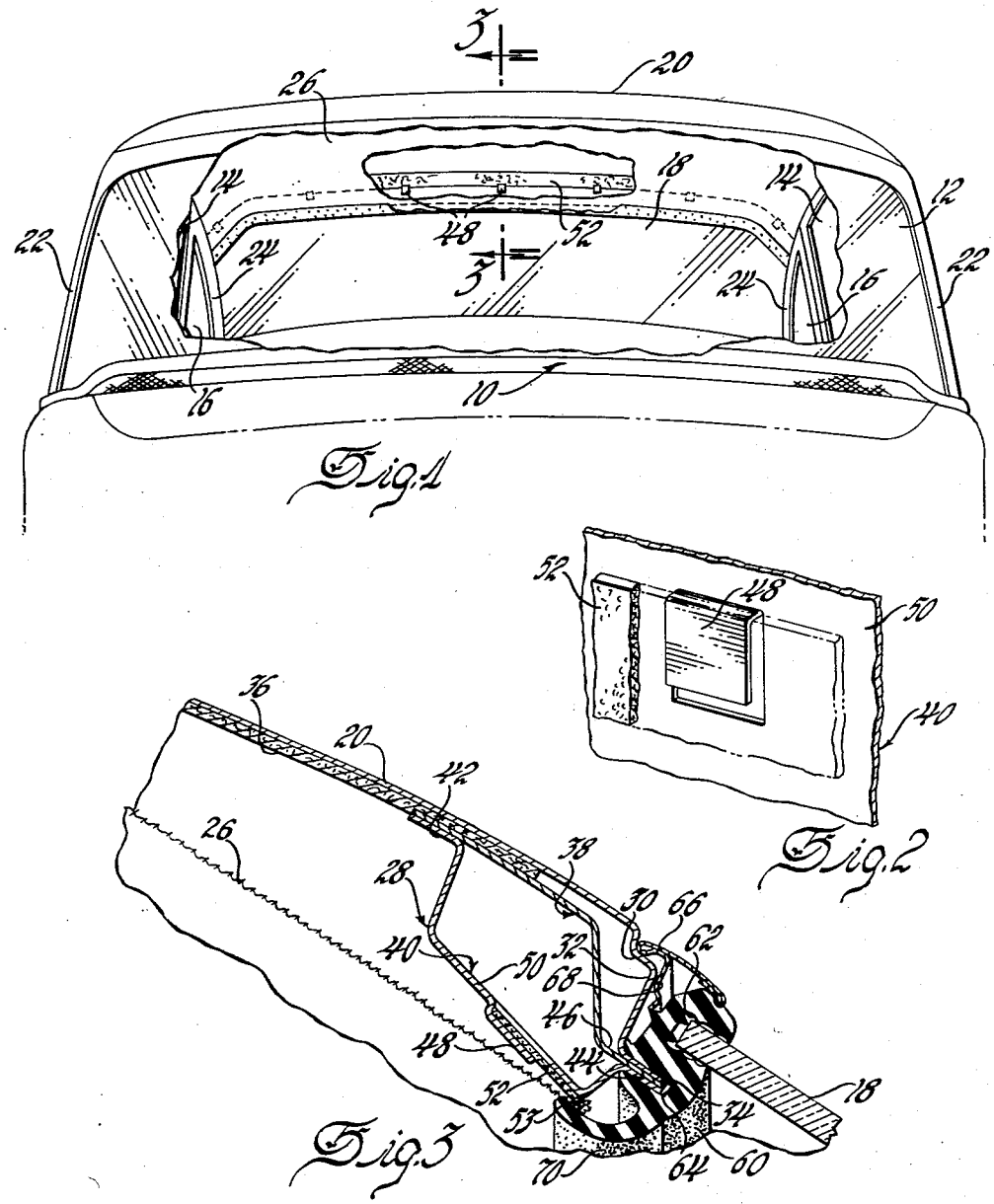
INVENTORS
George Dominick &
John E. Tessmar
By Paul Fitzpatrick
Attorney

United States Patent Office 2,955,875
Patented Oct. 11, 1960

2,955,875

FABRIC ATTACHMENT

George Dominick, Ferndale, and John E. Tessmar, Birmingham, Mich., assignors to General Motors Corporation, Detroit, Mich., a corporation of Delaware Continuation of application Ser. No. 513,938, June 8, 1955. This application Nov. 28, 1958, Ser. No. 777,152

4 Claims. (Cl. 296—137)

This invention relates to fabric attachment and more particularly to an improved manner of attaching headlining trim to a vehicle body. This application is a continuation of our copending application Serial No. 513,938, filed June 8, 1955, now abandoned.

The headlining trim conceals the inner surface of the roof panel of the body and is part of the interior fabric trim of the body. The headlining trim is supported within the body by a number of listing wires which span the body transversely thereof and are secured in a suitable manner within the side roof rail box sections. When the headlining is fitted on the body, the rear edge portion of the headlining is initially anchored on the rear roof rail box section, the headlining is then attached to the listing wires and secured to the front and side roof rail box sections after being pulled taut against the fabric anchor on the rear roof rail box section to prevent wrinkles and ensure a smooth appearance. This invention is directed to the anchoring of headlining trim on vehicle bodies and, in its preferred embodiment, provides a simple and expedient manner of anchoring headlining trim on the rear roof rail box section of a vehicle body without the necessity of any special tools.

The primary object of this invention is to provide a simple and expedient manner of anchoring headlining trim on a vehicle body.

This and other objects of this invention will be readily apparent from the following specification and drawings, in which:

Figure 1 is a perspective fragmentary view of a vehicle having the headlining thereof anchored in a manner according to this invention;

Figure 2 is a perspective enlarged view of a portion of Figure 1; and

Figure 3 is an enlarged sectional view on the plane indicated by line 3—3 of Figure 1.

Referring now to the drawings, a vehicle 10 includes a windshield 12, door windows 14, rear quarter windows 16, a rear window 18, and a roof panel 20 supported on the vehicle by windshield pillars 22 and rear quarter pillars 24. The headlining 26 conceals the inner surface of the roof panel and extends longitudinally of the body from the upper edge of the rear window to the upper edge of the windshield. The headlining is secured in a suitable manner to the side roof rail box sections (not shown), the rear roof rail box section 28, Figure 3, in a manner according to this invention, and in a suitable manner to the front roof rail box section (not shown). The headlining is also supported by a number of listing wires (not shown) extending transversely of the body and supported in a suitable manner by the side roof rail box sections.

Referring now to Figures 2 and 3, the rear portion of the roof panel 20 is provided with a shoulder portion 30, a flange portion 32 extending downwardly and inwardly from the shoulder portion, and a terminal flange portion 34 extending rearwardly and outwardly from flange portion 32. A layer of sound deadening material 36 is applied to the inner surface of roof panel 20 to reduce the noise within the passenger compartment of the vehicle.

The rear roof rail box section 28 includes an outer channel-shaped member 38 and an inner channel-shaped member 40. Member 40 includes a forwardly and outwardly extending terminal flange portion 42 which is spot welded to one edge portion of member 38, and a rearwardly and outwardly extending terminal flange portion 44 which is spot welded to a similar flange portion 46 of member 38 and flange portion 34 of the roof panel to provide a pinch weld. A number of offset spaced tabs 48 are lanced out of one wall 50 of channel member 40, with wall 50 extending obliquely with respect to the horizontal. Tabs 48 provide an interrupted rearwardly and downwardly opening channel across the inner surface of wall 50.

A cardboard or kraft board strip 52 has one end portion thereof secured at 53 to the headlining trim 26 by stitching or in any other suitable manner. When the headlining is fitted on the body, strip 52 is slipped under spaced offset tabs 48, the headlining is attached to the listing wires (not shown), and then the front and side edge portions of the headlining are attached in a suitable manner to the front and side roof rail box sections after the headlining has been pulled taut against the fabric anchor. Several suitable and conventional manners of attaching the headlining to the front and side roof rail box sections are well known in the art.

In order to pull the headlining taut to obtain a smooth appearance to the headlining after it has been attached to the body, the headlining must first be anchored at least at one edge portion thereof.

The present manner of attaching the headlining to the body provides a simple and expedient anchor. After the headlining has been pulled taut and attached to the front and side roof rail box sections, it can be seen that the cardboard or kraft board strip 52 is positioned obliquely to the plane of the adjacent portion of the headlining as the tension in the headlining retains the strip within the spaced tabs 48.

As shown in Figure 2 of the drawing, the thickness of the strip 52 is less than the distance between the under surface of tabs 48 and the outer surface of wall 50 of channel member 40 so that the strip 52 is loosely received within the interrupted channel defined by the tabs 48. Thus, after the headlining 26 has been pulled taut, the tension in the headlining is the sole means holding the strip within the interrupted channel. With this arrangement, the tension in the headlining biases the strip 52 into engagement with opposite sides of the interrupted channel provided by the tabs 48 and wall 50.

Figure 2 is a somewhat exaggerated showing of the clearance between the undersurface of the tabs 48 and the outer surface of wall 50, since the clearance should only be such whereby the strip 52 is received under the tabs 48 without having to in any manner force the strip under the tabs.

A weather strip 60 has a rearwardly and downwardly opening channel 62 receiving the upper edge portion of the rear window 18 and an upwardly and forwardly opening channel 64 which is fitted over the pinch weld formed by flanges 34, 44, and 46 to mount the weather strip on the body.

An exterior molding trim strip 66 extends between the shoulder portion 30 of the roof panel and the weather strip and is secured in place by a number of spaced clips (not shown) which slip over the pinch weld and detachably engage leg 68 of trim 66. Weather strip 60 is also provided with an arcuately shaped terminal flange portion 70 which is fitted over the edge portion of the headlining to conceal the seam between the headlining and the kraft board or cardboard strip 52. The flange portion 70 of the weather strip can be pulled away from the headlining to detach the headlining from the body.

Thus, this invention provides a simple and expedient manner of attaching the headlining to the body without the use of any special tools. The use of the offset tabs in the rear roof rail box section and the kraft board or cardboard strip to anchor the headlining allows the headlining to be pulled taut before it is attached to the front and side rail box sections to provide a smooth appearance to the headlining.

While a specific embodiment of this invention has been shown and described, various changes and modifications may be made within the scope and spirit of the invention without departing from it.

We claim:

1. In combination, a vehicle body having a body panel, a trim fabric for concealing a surface of said panel, and means for anchoring an edge portion of said fabric on said body panel whereby said fabric may be tensioned against said means into generally parallel spaced concealing relationship with said surface of said panel, said means comprising, a substantially rigid member secured to said edge portion of said fabric, and channel means on said body opening in a direction opposite the direction in which said fabric is tensioned and located generally downwardly divergently re-entrant with respect to the plane of said fabric, said channel means having a width greater than the thickness of said rigid member for loosely receiving said member, said member being located between said fabric and said panel when received within said channel means and being held therein against gravity and in biased engagement with opposite side walls thereof solely by the tension in said fabric.

2. In combination, a vehicle body having a body panel, a trim fabric for concealing a surface of said panel, and means for anchoring an edge portion of said fabric on said body across said panel whereby said fabric may be tensioned against said means into spaced concealing relationship with said surface of said panel, said means comprising, a substantially rigid member adapted to be secured to said edge portion of said fabric, means for securing said member and said fabric together adjacent said edge portion of said fabric, and channel means on said body positioned across said panel in spaced relationship thereto and opening in a direction opposite the direction in which said fabric is tensioned, said channel means being located generally downwardly divergently re-entrant with respect to the plane of said fabric, said channel means having a width greater than the thickness of said rigid member for loosely receiving said rigid member, said member being located between said fabric and said panel when received within said channel means and being held therein against gravity and in biased engagement with opposite side walls of said channel means solely by the tension in said fabric, said securing means between said member and said edge portion of said fabric being located outside of said channel means when said member is received therein whereby the tension in said fabric tends to bias said member within said channel means into engagement with opposite side walls thereof.

3. In combination, a vehicle body having a body panel, a trim fabric for concealing a surface of said panel, means for anchoring an edge portion of said fabric on said body across said panel whereby said fabric may be tensioned against said means into spaced concealing relationship with said surface of said panel, said means comprising, a substantially rigid member adapted to be secured to said edge portion of said fabric, means securing said member and said fabric together adjacent the edge portions thereo, a roof rail extending transversely of said panel and joined thereto, a plurality of lanced tabs on said roof rail defining a plurality of spaced channels opening in a direction opposite the direction in which said fabric is tensioned and located generally downwardly re-entrant with respect to the plane of said fabric, said space channels each having a width greater than the thickness of said rigid member for loosely receiving said member, said member being located between said fabric and said panel when received within said channels and being held therein against gravity and in biased engagement with opposite side walls of said channels solely by the tension in said fabric, said securing means being located outwardly of said channels when said member is received therein whereby the tension in said fabric tends to bias said member into engagement with opposite side walls of said channel, and molding means supported by said panel and having a flexible portion adapted to be disposed over said securing means to conceal the same.

4. In combination, a vehicle body having a roof panel, a trim fabric for concealing a surface of said panel, means for anchoring an edge portion of said fabric on said body whereby said fabric may be tensioned against said means into spaced concealing relationship with said surface of said panel, said means comprising, a substantially rigid member adapted to be secured to said edge portion of said fabric, means securing said member and said fabric together adjacent the edge portions thereof, a roof rail extending transversely of said panel and joined thereto at respective edge portions of said panel and said rail to provide a pinchweld flange structure defining a portion of a window opening, a plurality of lanced out tabs on said roof rail defining a plurality of spaced channels across said roof rail opening in a direction opposite the direction in which said fabric is tensioned and located generally downwardly divergently re-entrant with respect to the plane of said fabric, said channels each having a width greater than the thickness of said rigid member for loosely receiving said member, said member being located between said fabric and said panel when received within said channels and being held therein against gravity and in biased engagement with opposite side walls thereof solely by the tension in said fabric, said securing means being located outwardly of said channels and adjacent said flange structure, and a flexible weatherstrip supported by said flange structure and having a flexible lip portion adapted to be disposed over said securing means to conceal said securing means.

References Cited in the file of this patent

UNITED STATES PATENTS

| | | |
|---|---|---|
| 1,768,873 | Whitlock | July 1, 1930 |
| 1,789,015 | Moesta | Jan. 13, 1931 |
| 1,989,559 | Place | Jan. 29, 1935 |
| 2,023,188 | Abbott | Dec. 3, 1935 |
| 2,260,115 | Hathaway | Oct. 21, 1941 |
| 2,390,193 | Tandetzke | Dec. 4, 1945 |
| 2,563,221 | Doty | Aug. 7, 1951 |
| 2,610,335 | Baptista | Sept. 16, 1952 |

FOREIGN PATENTS

| | | |
|---|---|---|
| 936,185 | Germany | Dec. 7, 1955 |